US012608439B2

(12) United States Patent
    Fouda et al.

(10) Patent No.:  US 12,608,439 B2
(45) Date of Patent:  Apr. 21, 2026

(54) SYSTEM AND METHOD OF TRANSPOSED MATRIX-VECTOR MULTIPLICATION

(71) Applicant: OpenAI Opco, LLC, San Francisco, CA (US)

(72) Inventors: Mohammed Elneanaei Abdelmoneem Fouda, Irvine, CA (US); Ramyad Hadidi, University Park, MD (US)

(73) Assignee: OpenAI Opco, LLC, San Francisco, CA (US)

( * ) Notice: Subject to any disclaimer, the term of this patent is extended or adjusted under 35 U.S.C. 154(b) by 0 days.

(21) Appl. No.: 18/949,783

(22) Filed: Nov. 15, 2024

(65) Prior Publication Data

US 2025/0103680 A1    Mar. 27, 2025

Related U.S. Application Data

(63) Continuation of application No. 18/891,921, filed on Sep. 20, 2024, now abandoned.

(60) Provisional application No. 63/539,753, filed on Sep. 21, 2023.

(51) Int. Cl.
    *G06F 17/16*          (2006.01)
(52) U.S. Cl.
    CPC .................................... *G06F 17/16* (2013.01)
(58) Field of Classification Search
    CPC ......... G06F 17/16; G06F 7/5443; G06N 3/06; G06N 3/063; G06N 3/084
    See application file for complete search history.

(56) References Cited

U.S. PATENT DOCUMENTS

| | | | |
|---|---|---|---|
| 2019/0004997 A1* | 1/2019 | Cohen ...................... | G06F 7/52 |
| 2022/0019407 A1* | 1/2022 | Chih .................... | G11C 7/1036 |
| 2022/0188628 A1* | 6/2022 | Rasch ...................... | G06N 3/08 |

OTHER PUBLICATIONS

H. Jiang et al., "CIMAT: a transpose SRAM-based compute-in-memory architecture for deep neural network on-chip training" in Proceedings of the International Symposium on Memory Systems (MEMSYS '19). New York, NY, USA, 490-496. https://doi.org/10.1145/3357526.3357552 (Year: 2019).*
Y. Luo and S. Yu, "AILC: Accelerate On-Chip Incremental Learning With Compute-in-Memory Technology," in IEEE Transactions on Computers, vol. 70, No. 8, pp. 1225-1238, Aug. 1, 2021, doi: 10.1109/TC.2021.3053199. (Year: 2021).*

* cited by examiner

*Primary Examiner* — Carlo Waje
(74) *Attorney, Agent, or Firm* — Finnegan, Henderson, Farabow, Garrett & Dunnner, LLP

(57)          ABSTRACT

A system including a memory and hardware compute logic is described. The memory includes memory cells storing weights corresponding to a matrix. Hardware compute logic is coupled with the memory cells. The hardware compute logic is configured to perform a vector-matrix multiplication (VMM) for the matrix and for a matrix transpose for the weights being stationary for the memory cells.

20 Claims, 6 Drawing Sheets

<u>600</u>

602

Provide Input Vector to Compute Engine(s)

604

Select Vector Matrix Multiplication or Vector-Matrix Transpose Multiplication

606

Perform Vector Matrix Multiplication Using Selected Matrix/Selected Matrix Transpose While Weights Remain Stationary

SYSTEM AND METHOD OF TRANSPOSED MATRIX-VECTOR MULTIPLICATION

CROSS REFERENCE TO OTHER APPLICATIONS

This application is a continuation of U.S. patent application Ser. No. 18/891,921 entitled SYSTEM AND METHOD OF TRANSPOSED MATRIX-VECTOR MULTIPLICATION filed Sep. 20, 2024, which claims priority to U.S. Provisional Patent Application No. 63/539,753 entitled SYSTEM AND METHOD OF TRANSPOSED MATRIX-VECTOR MULTIPLICATION filed Sep. 21, 2023, both of which are incorporated herein by reference for all purposes.

BACKGROUND OF THE INVENTION

Artificial intelligence (AI), or machine learning, utilizes learning networks loosely inspired by the brain in order to solve problems. Learning networks typically include layers of weights that weight signals (mimicking synapses) combined with activation layers that apply functions to the signals (mimicking neurons). The weight layers are typically interleaved with the activation layers. Thus, the weight layer provides weighted input signals to an activation layer. Neurons in the activation layer operate on the weighted input signals by applying some activation function (e.g. ReLU or Softmax) and provide output signals corresponding to the statuses of the neurons. The output signals from the activation layer are provided as input signals to the next weight layer, if any. This process may be repeated for the layers of the network. Learning networks are thus able to reduce complex problems to a set of weights and the applied activation functions. The structure of the network and parameters used (e.g., number of layers, connectivity among the layers, dimensionality of the layers, number of weights, the type of activation function, etc.) are together known as a model. Learning networks can leverage hardware, such as graphics processing units (GPUs) and/or AI accelerators, which perform operations usable in machine learning in parallel. Such tools can dramatically improve the speed and efficiency with which data-heavy and other tasks can be accomplished by the learning network.

The weights in the weight layer may be represented as a matrix. Other aspects of the learning network may also be represented as matrices. The transposes of these matrices are often required to complete various tasks. For example, during training, the transpose of the weight matrix ($W^T$) is used for determining weight updates (e.g. using backpropagation). In another example, during inference in in attention-based models, a matrix multiplication involving the transpose of the key matrix, $K^T$ (which depends upon the weights), is used.

Although learning networks utilizing matrix transposes can be trained and used, there are drawbacks. Calculation of a matrix transpose may be time-consuming and/or require significant additional space. For example, in some instances, both the matrix and the matrix transpose are stored. Separate hardware may also be used to compute the matrix multiplications for the matrix and the matrix transpose. As a result, the amount of compute-in-memory (CIM) is doubled. Consuming such a large amount of area may be undesirable. Alternatively, weights (or other data stored in the matrix) may be moved from memory to be transposed and then to be rewritten back to the memory. The CIM units incorporating the memory may perform both the forward path (inference) and the backward (or other path requiring a matrix transpose) computations. The weights are then re-transposed and stored again for weight accumulation and next forward calculations. This may result in significant latencies. Accordingly, what is desired is an improved technique for performing computations using a matrix transpose in learning networks.

BRIEF DESCRIPTION OF THE DRAWINGS

Various embodiments of the invention are disclosed in the following detailed description and the accompanying drawings.

DETAILED DESCRIPTION

Figure 1A:
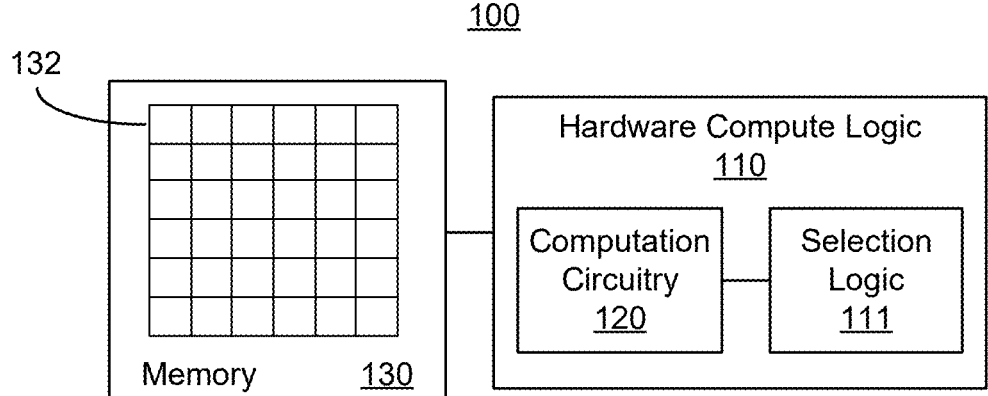
FIGS. 1A-1B depict an embodiment of a hardware system for performing a matrix multiplication and a matrix transpose multiplication and the environment in which such a system may be used.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system including a memory and hardware compute logic is described. The memory includes memory cells storing weights corresponding to a matrix. Hardware compute logic is coupled with the memory cells. The hardware compute logic is configured to perform a vector-matrix multiplication (VMM) for the matrix and for a matrix transpose for the weights being stationary for the memory cells. The hardware compute logic may include multiplication circuitry for each of the plurality of memory cells. The multiplication circuitry multiples at least a portion of a weight stored in a memory cell with a portion of an input vector to provide a product corresponding to the memory cell. Each memory cell is selected from a digital static random access memory (SRAM) memory cell and an analog SRAM memory cell.

In some embodiments, the hardware compute logic includes selection logic and adder trees. The adder trees are coupled with the selection logic and the memory. Each of the adder trees accumulates a sum of the product for each memory cell for a portion of the memory cells. The selection logic is configured to select a first portion of the plurality of adder trees for the VMM of the matrix and to select a second portion of the plurality of adder trees for the VMM of the matrix transpose. The selection logic may further include input logic configured to provide the portion of the input vector with the memory cell for the matrix or the matrix transpose. In some embodiments, each adder tree shares at least one adder with another adder tree. The selection logic may also include multiplexers. Each multiplexer is coupled with the adder(s) for selecting a product corresponding to the matrix or the matrix transpose.

In some embodiments, the hardware compute logic includes selection logic and adder trees. The adder trees are coupled with the selection logic and the memory. The selection logic is configured to provide to the plurality to adder trees, the product for the matrix or for the matrix transpose for each memory cell of the plurality of memory cells.

A hardware accelerator including processor(s) and compute tile(s) is described. Each commute tile includes memory and hardware compute logic (e.g. a compute-in-memory (CIM) module). The compute tile may also include a general-purpose processor and/or a local update module. In some embodiments, the memory and hardware compute logic are integrated into compute engine(s). The memory includes memory cells storing weights corresponding to a matrix. The hardware compute logic is coupled with the memory cells and configured to perform a VMM for the matrix and for a matrix transpose for the plurality of weights being stationary for the plurality of memory cells. The VMM may include both a vector-matrix multiplication and a matrix-matrix multiplication.

The hardware compute logic may include multiplication circuitry for each of the plurality of memory cells. The multiplication circuitry multiples at least a portion of a weight stored in a memory cell with a portion of an input vector to provide a product corresponding to the memory cell. Each memory cell is selected from a digital static random access memory (SRAM) memory cell and an analog SRAM memory cell.

In some embodiments, the hardware compute logic includes selection logic and adder trees. The adder trees are coupled with the selection logic and the memory. Each of the adder trees accumulates a sum of the product for each memory cell for a portion of the memory cells. The selection logic is configured to select a first portion of the plurality of adder trees for the VMM of the matrix and to select a second portion of the plurality of adder trees for the VMM of the matrix transpose. The selection logic may further include input logic configured to provide the portion of the input vector with the memory cell for the matrix or the matrix transpose. In some embodiments, each adder tree shares at least one adder with another adder tree. The selection logic may also include multiplexers. Each multiplexer is coupled with the adder(s) for selecting a product corresponding to the matrix or the matrix transpose.

A method is described. The method includes providing an input vector to compute engines coupled with a general-purpose processor. Each compute engines includes a CIM hardware module. The CIM hardware module includes a memory and hardware compute logic. The memory has memory cells that store weights corresponding to a matrix. The hardware compute logic is coupled with the memory cells and configured to perform a VMM for the matrix and for a matrix transpose for the plurality of weights being stationary for the plurality of memory cells. The hardware compute logic includes multiplication circuitry for each of the memory cells. The multiplication circuitry multiples at least a portion of a weight stored in a memory cell with a portion of an input vector to provide a product corresponding to the memory cell. The input vector may be a matrix. The method also includes selecting the matrix or the matrix transpose and performing the VMM of the input vector and the matrix or the matrix transpose based on the selection. The VMM uses at least one of the compute engines.

In some embodiments, the hardware compute logic further includes selection logic and adder trees coupled with the selection logic and the memory. Each adder trees accumulates a sum of the product of each memory cell for a portion of the plurality of memory cells. The selection logic is configured to select a first portion of the plurality of adder trees for the VMM of the matrix and to select a second portion of the plurality of adder trees for the VMM of the matrix transpose in response to the selection. In some such embodiments, each adder tree shares at least one adder with another adder tree of the plurality of adder trees. In some embodiments, the hardware compute logic further includes selection logic and adder trees coupled with the selection logic and the memory. The selection logic is configured to provide to the plurality to adder trees, the product for the matrix or for the matrix transpose for each memory cell of the plurality of memory cells.

Figure 1B:
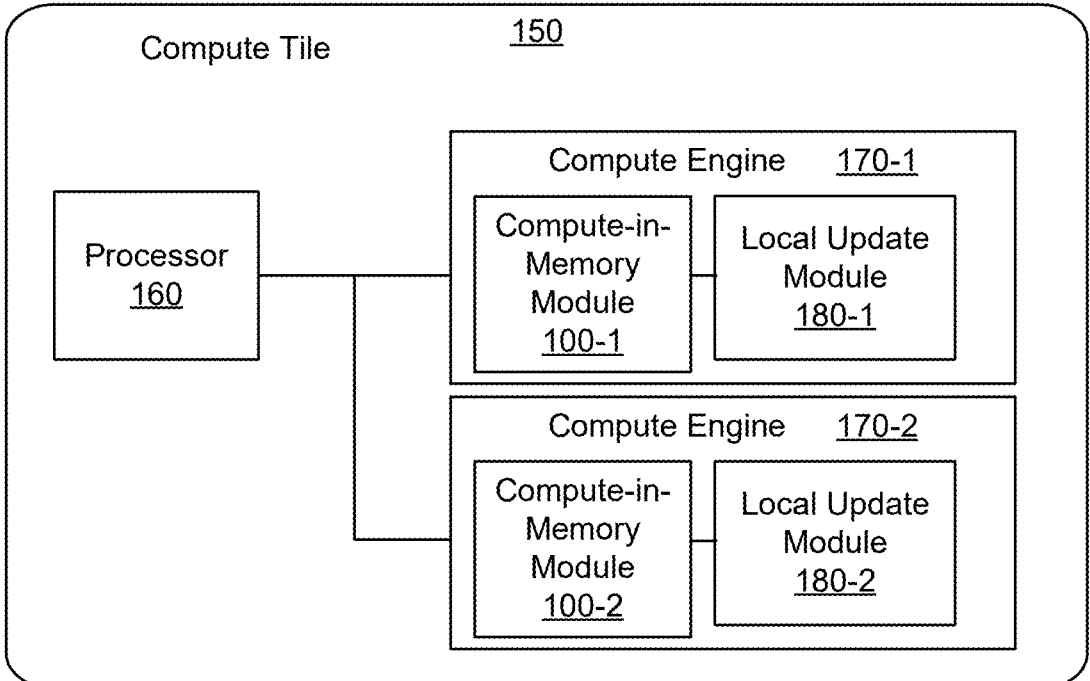

FIGS. 1A-1B depict an embodiment of hardware system 100 for performing a matrix multiplication and a matrix transpose multiplication and an environment 150 in which such a system may be used. For clarity, not all components are explicitly depicted. More specifically, FIG. 1A is a block diagram of hardware system 100 that may be considered a compute-in-memory (CIM) hardware module. Thus, system 100 may also be referred to as CIM hardware module 100. FIG. 1B is a block diagram of compute tile 150 in which CIM hardware module 100 may be used. CIM hardware module 100 and compute tile 150 may be part of a learning network. For example, CIM hardware module 100 and/or compute tile 150 may be part of a hardware artificial intelligence (AI) accelerator. Such a hardware AI accelerator may be deployed as part of a learning network for using a model. The structure of the learning network and parameters (e.g., number of layers, connectivity among the layers, dimensionality of the layers, the type of activation function, weights, etc.) may together be considered the model. Such an AI accelerator, and thus CIM hardware module 100, efficiently perform in parallel operations usable in machine learning. For example, CIM hardware module 100 performs operations for a vector-matrix multiplication (VMM) efficiently and in parallel. In some embodiments, system 100 and/or compute tile 150 may be used for other applications.

CIM hardware module 100 includes hardware compute logic 110 and memory 130. Other components may be present but are not shown for clarity. CIM hardware module 100 stores weights for the model and performs operations using the weights. More specifically, CIM hardware module 100 performs VMMs, where the vector may be an input vector provided to CIM hardware module 100 and the matrix may be weights (i.e. data/parameters) stored by CIM hardware module 100. To do so, CIM hardware module 100 utilizes memory 130 (e.g. that stores the weights) and hardware compute logic 110 (e.g. that performs the VMM of the stored weights). In some embodiments, the vector may be a matrix (i.e. an n×m vector where n>1 and m>1). Further, CIM hardware module 100 is configured such that a VMM of the vector and the matrix stored by memory 130 may be performed and a VMM of the vector and the transpose of the matrix ("matrix transpose") stored by memory 130 may be performed while in a weight stationary architecture. Stated differently, CIM hardware module 100 may perform the VMM of the vector and the matrix and the VMM of the vector and the matrix transpose without moving (e.g. reading and re-storing or reading from another location) the weights stored in memory 130.

Memory 130 includes memory cells 132 (only one of which is labeled for simplicity). Memory cells 132 may be static random access memory (SRAM) cells. For example, memory cells 132 may be analog SRAM cells and/or digital SRAM cells. Other types of cells are possible. For example, memory cells 132 may be resistive random access memory (RRAM) cells, magnetic random access (MRAM) memory cells, or other nonvolatile memory cells. Memory cells 132 store weights for a model. In some embodiments, positive and/or negative weights might be stored. In other embodiments, only positive (or only negative) weights may be stored. Although termed "weights," memory cells 132 may be considered to store data used in calculations performed by hardware system 100. Thus, the data stored need not represent a weight for, e.g., a learning network. However, for simplicity, the method and systems described herein are discussed in the context of weights. The weights stored by memory cells 132 correspond to a matrix. In some embodiments, each memory cell 132 stores a weight (i.e. an element of the matrix). In some embodiments, a weight may be stored in multiple memory cells 132 (i.e. a portion of the weight, or a portion of the element of the matrix, is stored a memory cell 132). For clarity of explanation, CIM hardware module 100 is described as storing a weight in a single memory cell 132. However, the discussion herein may be readily extended to weights being stored across multiple memory cells 132.

Hardware compute logic 110 is coupled with memory 130. Hardware compute logic 110 is configured to perform the VMM for the matrix and the VMM for the matrix transpose without moving the weights stored in memory cells 132. Stated differently, the weights stored in memory cells 132 need not be copied to another location and re-stored in memory 130 as the matrix transpose. Similarly, the weights for the matrix transpose need not be stored in a separate memory and the VMM for the matrix transpose calculated using either hardware compute logic 110 or separate hardware compute logic (not shown). Instead, hardware compute logic 110 may be capable of computing the VMM for the matrix stored in memory 132 and the VMM of the matrix transpose for the matrix stored in memory 132. Hardware compute logic 110 may also select between the VMM for the matrix and the VMM for the matrix transpose.

Hardware compute logic 110 thus includes computation circuitry 120 and selection logic 111 that is coupled with computation circuitry 120. Computation circuitry 120 may include multiplication circuitry as well as addition circuitry (e.g. adder tree(s)) used in the VMM. Computation circuitry 120 may also include circuitry used to convert between analog and digital signals. Such computation circuitry 120 performs operations such as multiplying the weight stored in memory cell 132 with a portion of an input vector to provide a product corresponding to the memory cell 132. Computation circuitry 120 may also perform addition and/or other operations used for the VMM. Selection logic 111 may be used to route the data to the appropriate portions of computation circuitry 120 such that the VMM of the matrix or the matrix transpose is performed based on the selection. For example, selection logic 111 may include multiplexers, transistors, switches, and/or other components controlled to provide the appropriate operations.

Referring to FIG. 1B, CIM hardware module 100 may be used in compute tile 150. Compute tile 150 includes processor 160 and compute engines 170-1 and 170-2 (collectively or generically 170). Although two compute engines 170 are shown, another number (typically a larger number) may be present. Processor 160 may be a reduced instruction set computer (RISC) processor, such as a RISC V or ARM processor. In some embodiments, multiple processors 160 may be present. In other embodiments, only a single processor 160 is present and coupled to compute engines 170.

Each compute engines 170-1 and 170-2 includes CIM hardware modules 100-1 and 100-2 (collectively or generically 100), respectively. Thus, CIM hardware module 100 of FIG. 1A may be used in FIG. 1B. In some embodiments, compute engine 170 may also include a local update module 180-1 and 180-2 (collectively or generically 180). In other embodiments, either or both local update module(s) 180 may be omitted. Local update module 180 allows for an update to the weights in CIM hardware module to be more readily determine on compute tile 150 and written to memory cells 132. For example, local update module 180 may read a memory cell 132, add the weight update to the memory cell, and re-write the updated weight to the memory cell 132. The weight update may be determined by local update module 180, processor 160, and/or another component.

In operation, CIM hardware module may be used to perform a VMM of the matrix or matrix transpose of the weights stored in memory 130. For example, processor 160 (or another component) may provide an input vector to compute engine(s) 170 and thus to CIM hardware module(s) 100. Processor 160, or another component, may also notify compute engine 170 and/or CIM hardware module(s) 100 whether a VMM of the matrix or the matrix transpose is desired. Selection logic 111 provides the elements of the input vector and/or weights stored in memory cells 132 to computation circuitry 120 that are appropriate for the VMM of the matrix (if selected) or the VMM of the matrix transpose (if selected). Selection logic 111 may also control other data flow in computation circuitry 120 for the appropriate computation. For example, the products of the weights stored in memory cells 132 with the elements of the input vector may be accumulated in the appropriate manner for the VMM of the vector with the matrix or the VMM of the vector with the matrix transpose.

Using CIM hardware module 100, efficiency and performance of a learning network may be improved. Because operations are performed in parallel, CIM hardware module 100 may dramatically reduce the time to perform the VMM that provides the weighted signal. Thus, performing inference(s) using CIM hardware module 100 may require less time and power. In addition, efficiency of performing a VMM for a matrix transpose is also improved. The matrix and the matrix transpose need not be stored in separate CIM hardware modules (not shown). For example, two CIM hardware modules—one for the matrix and one for the matrix transpose—are not needed. Instead, CIM hardware module 100 can perform both operations. As a result, CIM hardware module 100 consumes less area than a conventional system that separately stores a matrix and its transpose. Similarly, latency may be reduced as compared to a system that transposes the matrix when a VMM of the matrix transpose is to be performed. The weights stored in memory 130 need not be read, transposed, and re-written to memory 130 prior to a VMM of the matrix transpose. For example, CIM hardware module 100 can perform the VMM of the matrix of weights with an input vector for an inference (e.g. a forward pass through the learning network). CIM hardware module 100 can also perform the multiplication of the back propagated vector with the transpose of the matrix of weights to determine the weight updates (i.e. the backward pass through the learning network) while retaining the weights in memory 130. Thus, training may be improved.

Similarly, CIM hardware module 100 can efficiently perform inferences for models such as attention-based models (e.g. VMMs for the matrix transpose of a stored key matrix while retaining the key values in memory). For example, CIM hardware module 100 might be a dedicated module used for storing activation, K, and computing quantities with the transpose of K. CIM hardware module 100 that is capable of computing both the VMM for the matrix and the VMM for the matrix transpose may allow for pipelined calculations of the activation. Consequently, efficiency may be improved.

More specifically, in attention-based models, $QK^T$ is computed during an inference. Both the Q matrix and the K matrix are computed as part of the inference. For example, K and Q may each be the output of other CIM module(s). Determining Q and K may each take approximately the same amount of time. However, separately determining the transpose of K increases the time required for inference. Instead, K may bes programmed into memory cells 132. CIM hardware module 100 may then be utilized to provide $QK^T$ without separately determining the transpose of K. For example, the transpose of K need not be determined and stored in a separate CIM module. Thus, additional memory for $K^T$ need not be provided. Similarly, K need not read from memory, the transpose determined, and $K^T$ rewritten into the memory. Thus, latency may be improved. Use of CIM hardware module 100, particularly in conjunction with pipelining, may improve efficiency of inferences for attention-based models. Thus, inferences for such models may have reduced latency and/or reduced area requirements. Consequently, efficiency, latency, and required area for a learning network using CIM hardware module 100 may be improved.

Figure 2:
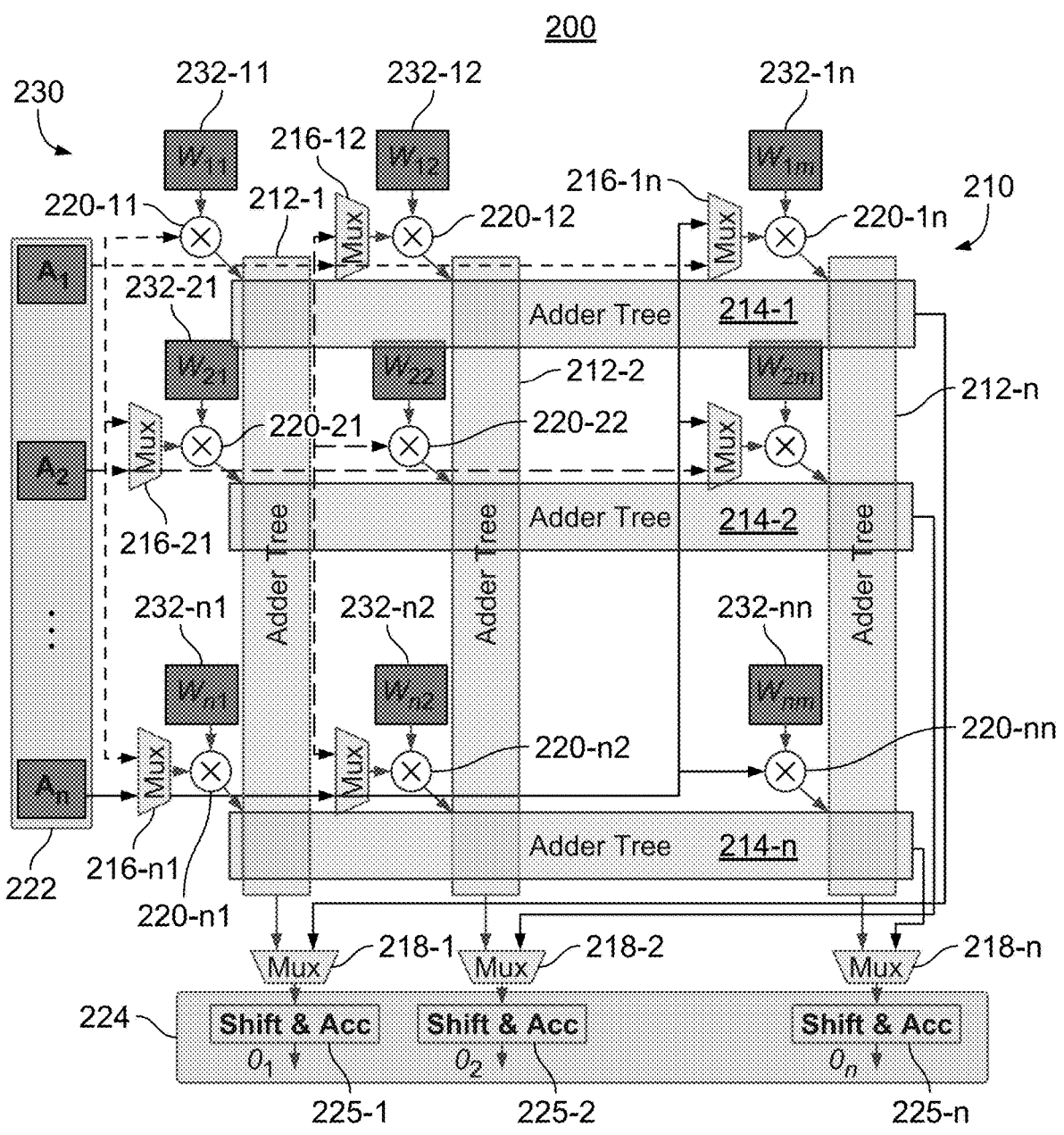
FIG. 2 depicts an embodiment of a hardware system for performing a matrix multiplication and a matrix transpose multiplication in which the weights may remain stationary and usable in an AI accelerator.

FIG. 2 depicts an embodiment of hardware system 200 for performing a matrix multiplication and a matrix transpose multiplication in which the weights may remain stationary and usable in an AI accelerator. Hardware system 200 is also referred to as CIM hardware module 200. CIM hardware module 200 may be part of a learning network. For example, CIM hardware module 200 may be part of a hardware AI accelerator. CIM hardware module 200 is analogous to CIM hardware module 100. Thus, CIM hardware module 200 includes memory 230 and hardware compute logic 210 analogous to memory 130 and hardware compute logic 110. CIM hardware module 200 performs operations for a VMM efficiently and in parallel. CIM hardware module 200 may perform the VMM of the vector and the matrix stored in CIM hardware module 200 and the VMM of the vector and the transpose of the matrix stored in CIM hardware module 200 (the matrix transpose) the without moving the weights stored in memory 230.

CIM hardware module 200 includes memory 230 having memory cells 232-11 through 232-nn (collectively or generically 232), of which only some are labeled and shown. Memory cells 232 store weights $W_{ij}$, where i and j indicate the row and column of the corresponding memory cell 232. Memory cells 232 may be SRAM cells, including, but not limited to digital SRAM cells. Memory 230 thus stores up to an n×n matrix (i.e. a square matrix). In some embodiments, memory 230 may store a rectangular matrix (e.g. an n×m matrix were n≠m). CIM hardware module 200 is described in the context of each memory cell 232 storing a weight. However, some memory cells 232 may be empty. For example, memory 230 may store an s×t matrix where s and/or t is less than n. Memory 230 may also store multiple matrices, where the total number of rows and total number of columns do not exceed n.

Hardware compute logic 210 includes vertical adder trees 212-1 through 212-n (collectively or generically 212), horizontal adder trees 214-1 through 214-n (collectively or generically 214), input vector multiplexers 216-ij where i and j denote the row and column (collectively or generically 216), output multiplexers 218-1 through 218-n (collectively or generically 218), multipliers 220-11 through 220-nn (collectively or generically 220), and shift and accumulator modules 225-1 through 225-n (collectively or generically 225). Also shown are input buffer 222 and output buffer 224. Adder trees 212 and 214, shift and accumulate modules 225, and multipliers 220 might be considered part of computation circuitry, while multiplexers 216 and 218 might be considered part of selection logic. However, because operation of these components is intertwined, the components are described simply as part of hardware logic 210.

In operation, vector A is provided to input buffer 222. A control signal is provided to multiplexers 216 and 218 that controls which operations are to be performed on the elements $A_i$, where i is 1, 2, . . . n. This is indicated by the lines from each $A_i$ in input buffer 222. The possible route of $A_1$ is shown by a dotted line, $A_2$ is shown by a dashed line, and $A_n$ is shown by a solid line. CIM hardware module 200 may perform VMMs AW and $AW^T$, where W is the matrix of weights stored in memory cells 232. Suppose, for example, the control signal indicates that the VMM to be performed is AW (e.g. the selection signal provided to multiplexers 216 and 218 is a logical "1"). In such a case, $A_1$ is provided to multiplier 220-11 because $A_1W_{11}$ is calculated for both the matrix and the matrix transpose. The output of multiplier 220-11 is provided to both adder trees 214-1 and 212-1. In another embodiment, a multiplexer may be used at each memory location to select the adder tree 212 or 214. However, using multiplexers 218 may be more efficient. Because a VMM for the weight matrix is performed, multiplexer 216-12 selects $A_1$ to be provided to multiplier 220-12. This is true for the multiplexers in the first row through multiplexer 216-1$n$, which provides $A_1$ to multiplier 220-1$n$. The outputs of these multipliers 220 are provided to adder trees 212-2 through 212-$n$ and 214-2 through 214-$n$. Similarly, $A_2$ is provided to multiplier 220-22 because $A_2 W_{22}$ is calculated for both the matrix and the matrix transpose. The output of multiplier 220-22 is provided to both adder trees 214-2 and 212-2. Because a VMM for the weight matrix is performed, multiplexer 216-21 selects $A_2$ to be provided to multiplier 220-21. This is true for the remaining multiplexers in the second row through multiplexer 216-2$n$, which provides $A_2$ to multiplier 220-2$n$. The outputs of these multipliers 220 are provided to remaining adder trees 212 and 214. Analogous calculations are carried out for the remaining elements of vector A. Because a VMM for the weight matrix, W, is performed, multiplexers 218 select the output from vertical adder trees 212 to provide to shift and accumulate modules 225. Thus, AW is output from CIM hardware module 200.

Suppose instead the control signal indicates that the VMM to be performed is $AW^T$ (e.g. the selection signal provided to multiplexers 216 and 218 is a logical "0"). In such a case, $A_1$ is provided to multiplier 220-11 because $A_1 W_{11}$ is calculated for both the matrix and the matrix transpose. The output of multiplier 220-11 is provided to both adder trees 214-1 and 212-1. Because a VMM for the weight matrix transpose is performed, multiplexer 216-21 selects $A_1$ to be provided to multiplier 220-21. This is true for the multiplexers in the first column through multiplexer 216-$n$1, which provides $A_1$ to multiplier 220-$n$1. The outputs of these multipliers 220 are provided to adder trees 212-2 through 212-$n$ and 214-2 through 214-$n$. Similarly, $A_2$ is provided to multiplier 220-22 because $A_2 W_{22}$ is calculated for both the matrix and the matrix transpose. The output of multiplier 220-22 is provided to both adder trees 214-2 and 212-2. Because a VMM for the weight matrix transpose is performed, multiplexer 216-12 selects $A_2$ to be provided to multiplier 220-12. This is true for the remaining multiplexers in the second column through multiplexer 216-$n$2, which provides $A_2$ to multiplier 220-$n$2. The outputs of these multipliers 220 are provided to remaining adder trees 212 and 214. Analogous calculations are carried out for the remaining elements of vector A. Because a VMM for the weight matrix transpose, $W^T$, is performed, multiplexers 218 select the output from horizontal adder trees 214 to provide to shift and accumulate modules 225. Thus, $AW^T$ is output from CIM hardware module 200.

CIM hardware module 200 may share the benefits of CIM hardware module 100. Using CIM hardware module 200, efficiency and performance of a learning network may be improved. Because operations are performed in parallel, CIM hardware module 200 may reduce the time to perform VMMs generally. Thus, performing inference(s) using CIM hardware module 200 may require less time and power. As described, CIM hardware module 200 performs both a VMM for the weight matrix and a VMM for the weight matrix transpose while allowing the weights to remain stationary (e.g. unchanged) in memory cells 232. Thus, area is reduced as compared to the use of two, separate CIM hardware modules for the matrix and matrix transpose. Latency is reduced as compared to the use of a single CIM hardware module in which the weights are read, stored, and rewritten for the matrix transpose. Because two sets of adder trees 212 and 214 are used, CIM hardware module 200 does have a larger area than a CIM hardware module (not shown) that only performs a VMM for a matrix and only has one set of adder trees. In some embodiments, there may be a 50-80% area increase over such a CIM hardware module using a single set of adder trees, and/or 70%-90% power increase. However, CIM hardware module 200 has increased functionality over such a CIM hardware module and may have reduced latency for the VMM of the matrix transpose. Thus, performance of a learning network incorporating CIM hardware module 200 may be improved.

Figure 3:
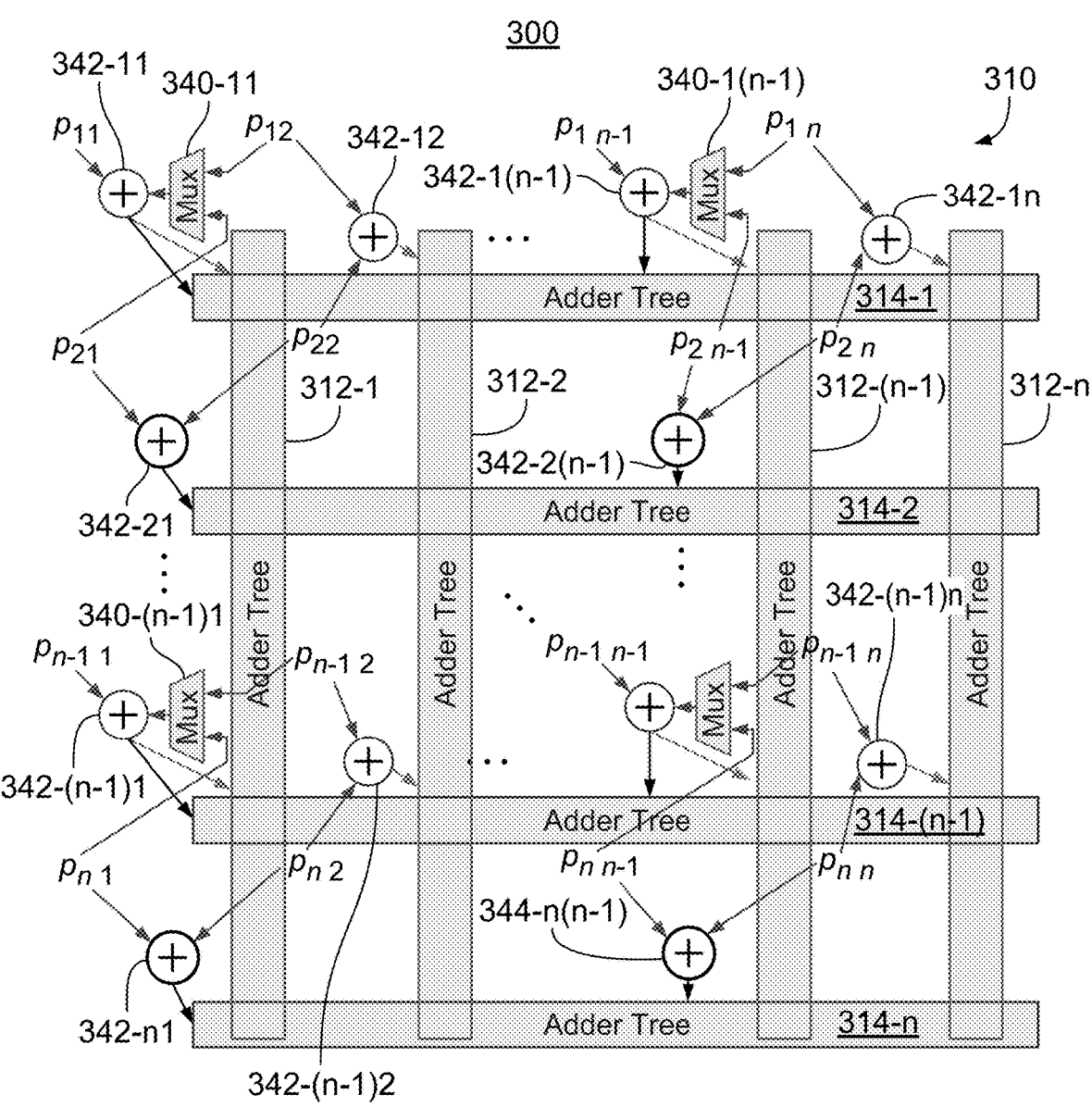
FIG. 3 depicts a portion of an embodiment of a hardware system for performing a matrix multiplication and a matrix transpose multiplication in which the weights may remain stationary and that is usable in an AI accelerator.

FIG. 3 depicts a portion of an embodiment of hardware system 300 for performing a matrix multiplication and a matrix transpose multiplication in which the weights may remain stationary and that is usable in an AI accelerator. Hardware system 300 is also referred to as CIM hardware module 300. CIM hardware module 300 may be part of a learning network. For example, CIM hardware module 300 may be part of a hardware AI accelerator. CIM hardware module 300 is analogous to CIM hardware module(s) 100 and/or 200. Thus, CIM hardware module 300 includes a memory (not shown) and hardware compute logic 310 analogous to memory 130 and/or 230 and hardware compute logic 110 and/or 210. CIM hardware module 300 is described in the context of an n×n matrix (i.e. a square matrix). In some embodiments, a rectangular matrix (e.g. an n×m matrix were n #m) may be used. CIM hardware module 300 performs operations for a VMM efficiently and in parallel. CIM hardware module 300 may perform the VMM of the vector and the matrix stored in CIM hardware module 300 and the VMM of the vector and the transpose of the matrix stored in CIM hardware module 300 (the matrix transpose) the without moving the weights stored in the memory.

CIM hardware module 300 includes vertical adder trees 312-1 through 312-$n$ (collectively or generically 312) and horizontal adder trees 314-1 through 314-$n$ (collectively or generically 314) that are analogous to adder trees 212 and 214, respectively. However, horizontal adder trees 312 share some adders with vertical adder trees 314. Thus, multiplexers 340-$ij$ (collectively or generically 340) and adders 342-$ij$ (collectively or generically 342), where i and j denote the row and column, are shown. Consequently, adder trees 312 and 314 have fewer adders than adder trees 212 and 214. In some embodiments, the remaining portions of CIM hardware module 300 are analogous to portions of CIM hardware module 200. For clarity, these portions of CIM hardware module 300 are not depicted in FIG. 3. For example, the individual memory cells and memory are not shown for CIM hardware module 300. Similarly, portions of hardware compute logic 310 that select the elements of the input vector to multiply with the contents of the memory cell are not shown. Further, portions of hardware compute logic 310 that select the adder trees 312 or 314, shift and accumulate modules, the input buffer, and the output buffer are not shown. These portions of CIM hardware module 300 are analogous to those of CIM hardware module 200 (e.g. multiplexers 216, multiplexers 218, multipliers 220, shift and accumulate modules 225, memory cells 232, input buffer 222, and output buffer 224). However, the products of the memory cells with the appropriately selected element of the vector are shown. For example, $p_{11}$ is the product of $A_1$ and $W_{11}$; $p_{12}$ is the product of either $A_1$ or $A_2$ and $W_{12}$. $A_1$ or $A_2$ is selected by a multiplexer corresponding to multiplexer 216-12, as described for CIM hardware module 200. Thus, other than sharing of adders 342 and corresponding use of multiplexers 340, CIM hardware module 300 is most analogous to CIM hardware module 200.

In operation, the elements of the input vector A (not shown in FIG. 3) are selected for multiplication with the contents of the appropriate memory cell (e.g. the appropriate weight $W_{ij}$) as described for FIG. 2. This results in products $p_{ij}$, where i and j denote the row and column of the matrix, shown in FIG. 3. The same control signal provided to multiplexers 216 and 218 may be used for multiplexers 340. Consequently, the appropriate products are produced for the VMM of the matrix or matrix transpose. Suppose, for example, that a VMM of vector A with the weight matrix W (AW) is to be performed. The appropriate selection signal (e.g. a logical "1") is provided to multiplexers 340. Product $p_{11}$ is provided to adder 342-11. This is because $A_1$ is multiplied by $W_{11}$ for VMM of the matrix and the matrix transpose. For a matrix multiplication, multiplexer 340-11 selects product $p_{21}$ to be input to adder 342-11. The sum of products $p_{11}$ and $p_{21}$ is provided to adder trees 312-1 and 314-1. Product $p_{12}$ and product $p_{22}$ (which is the same for a both VMM of a matrix and a VMM of a matrix transpose) are added by adder 342-12 and provided to adder tree 312-2. Analogous operations are performed for remaining multiplexers 340 and shared adders 342. For example, multiplexer 340-1$(n-1)$ selects product $p_{2(n-1)}$ to be input to adder 342-1$(n-1)$ to be added with product $p_{1(n-1)}$. This sum is provided to both adder trees 314-1 and 312-$(n-1)$. Product pin and product $p_{2n}$ are added by adder 342-1$n$ and provided to adder tree 312-$n$. For example, multiplexer 340-$(n-1)$1 selects product $p_{n1}$ to be input to adder 342-$(n-1)$1 to be added with product $p_{(n-1)1}$. This sum is provided to both adder trees 314-$(n-1)$ and 312-1. Product $p_{(n-1)2}$ and product $p_{n2}$ are added by adder 342-1$n$ and provided to adder tree 312-2. Because a VMM for the matrix is being performed, the outputs of vertical adder trees 312 are provided to a shift and accumulate module (not shown). Thus, AW is output from CIM hardware module 300.

Suppose that a VMM of vector A with the weight matrix transpose $W^T$ ($AW^T$) is to be performed. The appropriate selection signal (e.g. a logical "0") is provided to multiplexers 340. Product $p_{11}$ is provided to adder 342-11. This is because $A_1$ is multiplied by $W_{11}$ for VMM of the matrix and the matrix transpose. Multiplexer 340-11 selects product $p_{12}$ to be input to adder 342-11. The sum of products $p_{11}$ and $p_{12}$ is provided to adder trees 312-1 and 314-1. Product $p_{21}$ and product $p_{22}$ are added by adder 342-21 and provided to adder tree 314-2. Analogous operations are performed for remaining multiplexers 340 and shared adders 342. For example, multiplexer 340-1$(n-1)$ selects product pin to be input to adder 342-1$(n-1)$ to be added with product $p_{1(n-1)}$. This sum is provided to both adder trees 314-1 and 312-$(n-1)$. Product $p_{2(n-1)}$ and product $p_{2n}$ are added by adder 342-2$(n-1)$ and provided to adder tree 314-2. For example, multiplexer 340-$(n-1)$1 selects product $p_{(n-1)2}$ to be input to adder 342-$(n-1)$1 to be added with product $p_{(n-1)1}$. This sum is provided to both adder trees 314-$(n-1)$ and 312-1. Product $p_{n1}$ and product $p_{n2}$ are added by adder 342-1$n$ and provided to adder tree 314-$n$. Because a VMM for the matrix transpose is being performed, the outputs of horizontal adder trees 314 are provided to a shift and accumulate module (not shown). Thus, $AW^T$ is output from CIM hardware module 300.

CIM hardware module 300 may share the benefits of CIM hardware modules 100 and 200. Using CIM hardware module 300, efficiency and performance of a learning network may be improved. Because operations are performed in parallel, CIM hardware module 200 may reduce the time to perform VMMs generally. Thus, performing inference(s) using CIM hardware module 300 may require less time and power. As described, CIM hardware module 300 performs both a VMM for the weight matrix and a VMM for the weight matrix transpose while allowing the weights to remain stationary (e.g. unchanged) in memory cells. Thus, area is reduced as compared to the use of two, separate CIM hardware modules for the matrix and matrix transpose. Latency is reduced as compared to the use of a single CIM hardware module in which the weights are read, stored, and rewritten for the matrix transpose. Although two sets of adder trees 312 and 314 are used, CIM hardware module 300 shares some adders. This reduces the complexity of adder trees 312 and 314. For example, the number of adders in the first level of the adder tree is $$\frac{n^2}{2}.$$

The adder trees 312 and 314 may be reduced in area of the adder trees 212 and 214 by approximately twenty-five percent. Thus, latencies may be mitigated and an additional reduction in area over conventional systems may be achieved. Thus, performance of a learning network incorporating CIM hardware module 300 may be improved.

Figure 4:
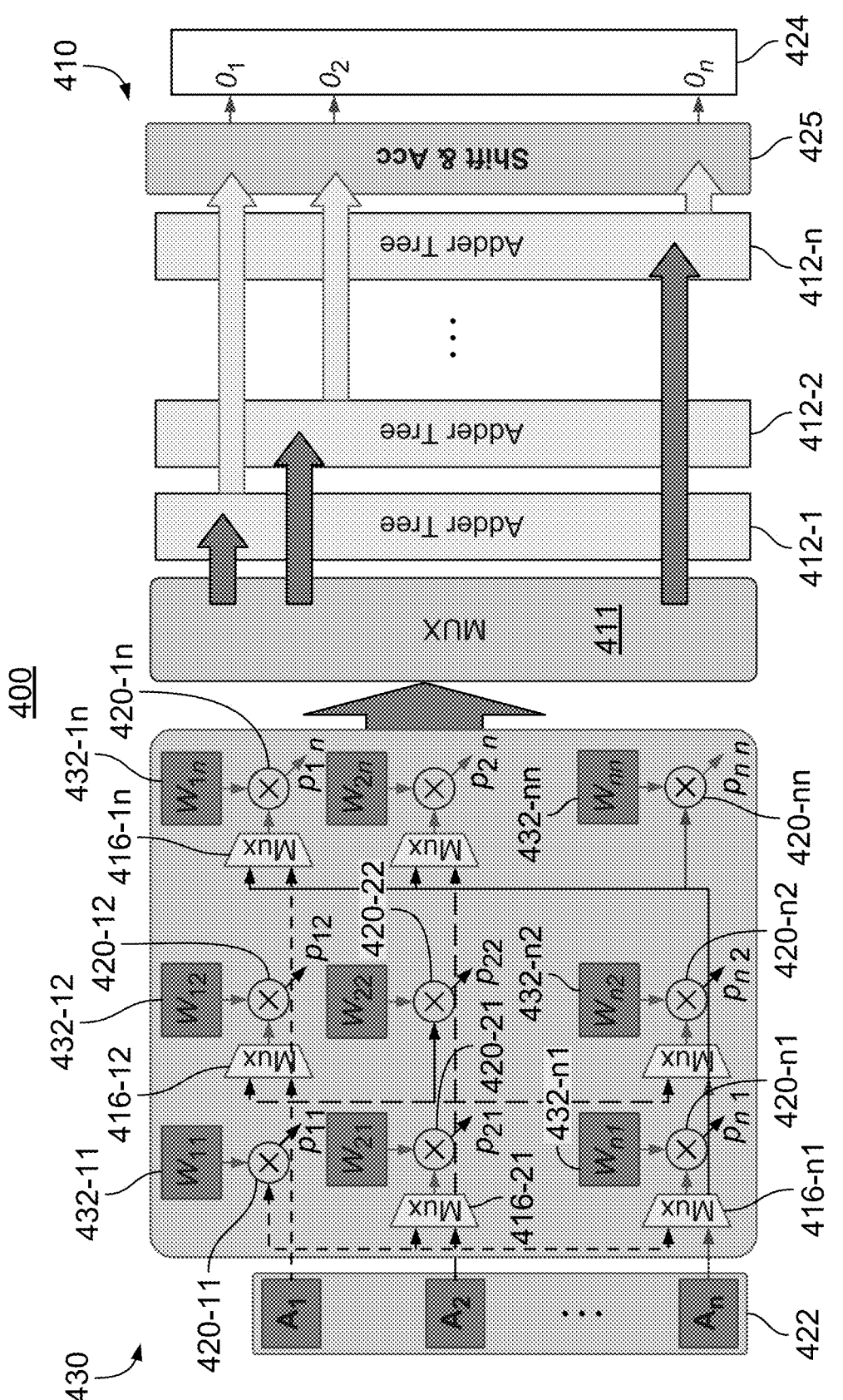
FIG. 4 depicts an embodiment of a hardware system for performing a matrix multiplication and a matrix transpose multiplication in which the weights may remain stationary and that is usable in an AI accelerator.

FIG. 4 depicts a portion of an embodiment of hardware system 400 for performing a matrix multiplication and a matrix transpose multiplication in which the weights may remain stationary and that is usable in an AI accelerator. Hardware system 400 is also referred to as CIM hardware module 400. CIM hardware module 400 may be part of a learning network. For example, CIM hardware module 400 may be part of a hardware AI accelerator. CIM hardware module 400 is analogous to CIM hardware module(s) 100, 200, and/or 300. Thus, CIM hardware module 400 includes a memory 430 and hardware compute logic 410 analogous to memory 130 and/or 230 and hardware compute logic 110, 210, and/or 310. CIM hardware module 400 performs operations for a VMM efficiently and in parallel. CIM hardware module 400 may perform the VMM of the vector and the matrix stored in CIM hardware module 400 and the VMM of the vector and the transpose of the matrix stored in CIM hardware module 400 (the matrix transpose) the without moving the weights stored in the memory.

CIM hardware module 400 includes memory 430 having memory cells 432-11 through 432-$nn$ (collectively or generically 432), of which only some are labeled and shown. Memory cells 432 store weights $W_{ij}$, where i and j indicate the row and column of the corresponding memory cell 432. Memory cells 432 may be SRAM cells, including, but not limited to digital SRAM cells. Memory 430 thus stores up to an n×n matrix (i.e. a square matrix). However, a memory capable of storing a rectangular matrix (i.e. an n×m matrix where n #m) may be used. CIM hardware module 400 is described in the context of each memory cell 432 storing a weight. However, some memory cells 432 may be empty. For example, memory 430 may store an s×t matrix where s and/or t is less than n. Memory 430 may also store multiple matrices, where the total number of rows and total number of columns do not exceed n.

Hardware compute logic 410 includes adder trees 412-1 through 412-$n$ (collectively or generically 412), input vector multiplexers 416-$ij$ where i and j denote the row and column (collectively or generically 416), multipliers 420-11 through 420-$nn$ (collectively or generically 420), shift and accumulate module 425 and multiplexer module 411. Also shown are input buffer 422 and output buffer 424. Adder trees 412, shift and accumulate module 425, and multipliers 420 might be considered part of computation circuitry, while multiplexers 416 and multiplexer module 411 might be considered part of selection logic. However, because operation of these components are intertwined, they are described simply as part of hardware logic 410.

Memory 430, memory cells 432, multiplexers 416, and multipliers 420 operate in an analogous manner to memory 230 memory cells 232, multiplexers 216, and multipliers 220. For example, multiplexers 416 may be controller by a control signal analogous to that described herein. However, the output of multipliers 420 (products $p_{ij}$, where i and j are the row and column) is provided to multiplexer module 411. Multiplexer module 411 determines, based on the control signal, which products $p_{ij}$ are passed to which adder trees 412.

In operation, vector A is provided to input buffer 422. A control signal is provided to multiplexers 416 that controls which elements $A_i$, where i is 1, 4, . . . n, are to be multiplied by the which weights. This is indicated by the lines from each $A_i$ in input buffer 422. The possible route of $A_1$ is shown by a dotted line, $A_2$ is shown by a dashed line, and $A_n$ is shown by a solid line. CIM hardware module 400 may perform VMMs AW and $AW^T$, where W is the matrix of weights stored in memory cells 432. Suppose, for example, the control signal indicates that the VMM to be performed is AW (e.g. the selection signal provided to multiplexers 416 is a logical "1"). In such a case, $A_1$ is provided to multiplier 420-11 because $A_1 W_{11}$ is calculated for both the matrix and the matrix transpose. Because a VMM for the weight matrix is performed, multiplexer 416-12 selects $A_1$ to be provided to multiplier 420-12. Multiplier 420-12 outputs product $p_{12}$. The remaining elements in the first row, through memory cell 432-1n, multiplexer 416-1n, and multiplier 420-1n, are controlled in an analogous manner. For example, $A_2$ is provided to multiplier 420-22 because $A_2 W_{22}$ (product $p_{22}$) is calculated for both the matrix and the matrix transpose. The output of multiplier 420-22 is product $p_{22}$, is provided. These products are provided to multiplexer module 411. Multiplexer module 411 routes the appropriate products $p_{ij}$ for a VMM of the weight matrix to the corresponding adder trees 412. This. A VMM for the matrix may be performed.

For a VMM of the matrix transpose ($AW^T$), In operation, vector A is provided to input buffer 422. The control signal may indicate that the VMM to be performed is $AW^T$ (e.g. the selection signal provided to multiplexers 416 is a logical "0"). In such a case, $A_1$ is provided to multiplier 420-11 because $A_1 W_{11}$ is calculated for both the matrix and the matrix transpose. Because a VMM for the weight matrix is performed, multiplexer 416-12 selects $A_2$ to be provided to multiplier 420-12. Multiplier 420-12 outputs product $p_{12}$. The remaining elements in the first row, through memory cell 432-1n, multiplexer 416-1n, and multiplier 420-1n, are controlled in an analogous manner. For example, $A_n$ is provided to multiplier 420-1n. These products are provided to multiplexer module 411. Multiplexer module 411 routes the appropriate products $p_{ij}$ for a VMM of the weight matrix to the corresponding adder trees 412. This. A VMM for the matrix transpose may be performed.

CIM hardware module 400 may share the benefits of CIM hardware modules 100, 200, and/or 300. Using CIM hardware module 400, efficiency and performance of a learning network may be improved. Because operations are performed in parallel, CIM hardware module 400 may reduce the time to perform VMMs generally. Thus, performing inference(s) using CIM hardware module 400 may require less time and power. As described, CIM hardware module 400 performs both a VMM for the weight matrix and a VMM for the weight matrix transpose while allowing the weights to remain stationary (e.g. unchanged) in memory cells 432. Thus, area is reduced as compared to the use of two, separate CIM hardware modules for the matrix and matrix transpose. Latency is reduced as compared to the use of a single CIM hardware module in which the weights are read, stored, and rewritten for the matrix transpose. Moreover, only a single set of adder trees 412 is used. This allows for a reduction in power and complexity as compared to adder trees 212 and 214 and adder trees 312 and 314. Routing and multiplexing may be made more complex. In some embodiments, the area and the power are expected to increase by twenty-five percent to forty percent over a CIM hardware module configured only to perform a VMM of a matrix. The multiplexer module 411 size may be $n^2 \times P$, where P is the precision of the product, and may generate $n \times nP$ independent signals passed to adder trees 412. Thus, performance of a learning network incorporating CIM hardware module 400 may still be improved.

Figure 5A:
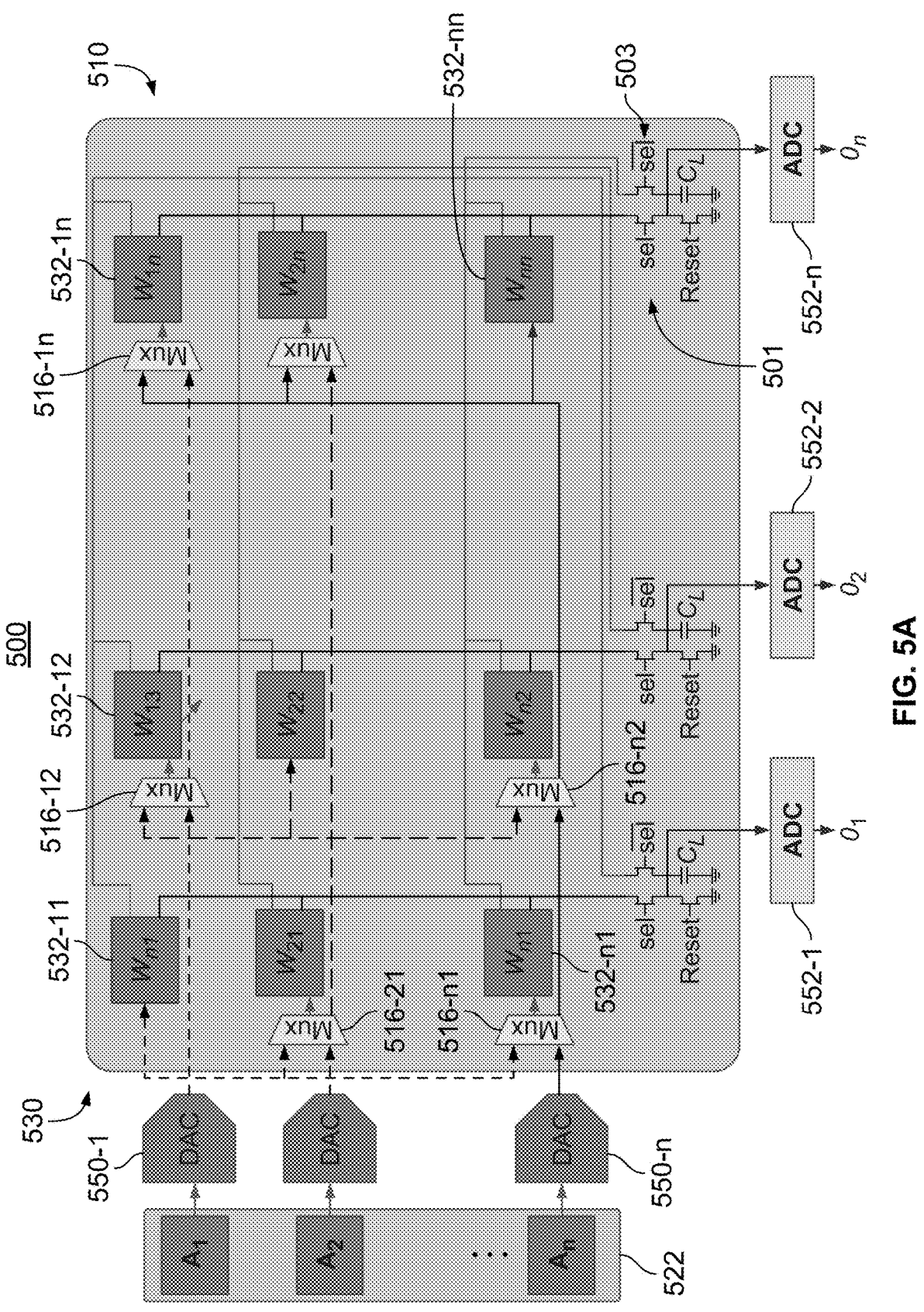
FIGS. 5A-5B depict an embodiment of a hardware system for performing a matrix multiplication and a matrix transpose multiplication in which the weights may remain stationary and that is usable in an AI accelerator.
Figure 5B:
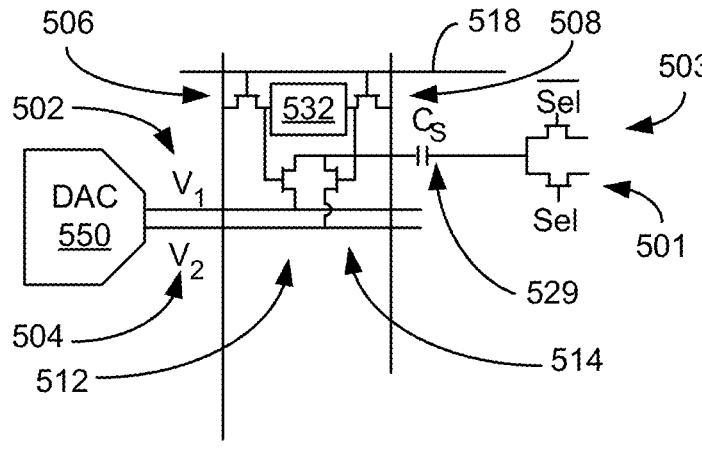

FIGS. 5A-5B depicts an embodiment of hardware system 500 for performing a matrix multiplication and a matrix transpose multiplication in which the weights may remain stationary and that is usable in an AI accelerator. FIG. 5A depicts a portion of hardware system 500. FIG. 5B depicts a portion of memory 530. Hardware system 500 is also referred to as CIM hardware module 500 and utilizes analog memory cells. CIM hardware module 500 may be part of a learning network. For example, CIM hardware module 500 may be part of a hardware AI accelerator. CIM hardware module 500 is analogous to CIM hardware module(s) 100, 200, 300, and/or 400. Thus, CIM hardware module 500 includes a memory 530 and hardware compute logic 510 analogous to memory 130, 230, and/or 430 and hardware compute logic 110, 210, 310, and/or 410. CIM hardware module 500 performs operations for a VMM efficiently and in parallel. CIM hardware module 500 may perform the VMM of the vector and the matrix stored in CIM hardware module 500 and the VMM of the vector and the transpose of the matrix stored in CIM hardware module 500 (the matrix transpose) the without moving the weights stored in the memory.

CIM hardware module 500 includes memory 530 having memory cells 532-11 through 532-nn (collectively or generically 532), of which only some are labeled and shown. Memory cells 532 store weights $W_{ij}$, where i and j indicate the row and column of the corresponding memory cell 532. Memory 530 thus stores up to an n×n matrix (i.e. a square matrix). However, a memory capable of storing a rectangular matrix (i.e. an n×m matrix where n #m) may be used. CIM hardware module 500 is described in the context of each memory cell 532 storing a weight. However, some memory cells 532 may be empty. For example, memory 530 may store an s×t matrix where s and/or t is less than n. Memory 530 may also store multiple matrices, where the total number of rows and total number of columns do not exceed n.

Memory cells 532 are analog memory cells. In the embodiment shown, memory cells 532 are analog SRAM memory cells. In some embodiments, other analog memory cells may be used. Consequently, CIM hardware module 500 includes digital-to-analog converters (DACs) 550-1 through 550-n (collectively or generically 550), only some of which are labeled and shown, and analog-to-digital converters (ADCs) 552-1 through 552-n (collectively or generically 552), only some of which are labeled and shown. Further, multiplexers 516-ij, where i and j correspond to the row and column, (collectively or generically 516) are shown for hardware compute logic 510. Thus, multiplexers 516 control which element of input vector A 522 is multiplied with the corresponding memory cell 532. Multiplexers 516 in combination with selection transistors 501 and 503 may be used to determine whether a VMM is performed for the matrix or the matrix transpose stored in memory 530.

FIG. 5B depicts an embodiment of memory cell 532 in one embodiment of CIM module 500. Memory cell 532 is an analog SRAM cell. Also shown is DAC 550. Memory cells 532 may be arranged in an array as depicted in FIG. 5A. Also shown are lines 501, 502, 503, 504, and 518, transistors 506, 508, 512, and 514, and capacitor 529 (Cs). In the embodiment shown in FIGS. 5A-5B, DAC 550 converts a digital input voltage to differential voltages, $V_1$ and $V_2$, with zero reference. These voltages are coupled to each cell 532 within the row. DAC 550 is thus used to temporal code differentially. Lines 502 and 504 carry voltages $V_1$ and $V_2$, respectively, from DAC 550. Line 518 is coupled with an address decoder (not shown in FIGS. 5A-5B) and used to select cell 532 via transistors 506 and 508. Transistors 501 and 503 are coupled with reset transistor and capacitor $C_L$ shown in FIG. 5A. For a precision memory, capacitor 529 ($C_s$) may be considered to store the weight for each cell 532.

Before every evaluation cycle, all capacitor voltages may be set to zero through reset transistor. DAC 550 provides the differential voltages on lines 502 and 504, and the row of cell 532 is selected via line 518. Transistor 512 passes input voltage $V_1$ if SRAM cell 532 stores a logical 1, while transistor 514 passes input voltage $V_2$ if SRAM cell 532 stores a zero. Consequently, capacitor 529 is provided with the appropriate voltage based on the contents of SRAM cell 532. During the evaluation cycle, an analog voltage $V_i$ is passed to capacitor 529 ($C_s$) of each cell. Thus, a capacitive voltage divider is present. Each row contributes a corresponding voltage to the capacitor $C_L$. For simplicity, the following discussion assumes binary cells 532. However, in some embodiments, memory cells 532 are not binary. The discussion below may be readily extended to such cells. Each row contributes to the total voltage by $$\frac{c_s}{Mc_s + c_L} V_i$$

if a logical one is stored in the SRAM cell 532, where M is the number of rows. The output may be measured across load capacitor $C_L$ and provided to the appropriate component (e.g. an analog bit mixer). This output voltage $V_o$ is given by:

$$V_o = [C_s / (MC_s + C_L)] \sum_i^M W_{ij} V_i$$

Load capacitors, $C_L$, may be shared between rows and columns. Switching transistors may be used to couple load capacitors $C_L$ to the appropriate row or column. Multiplexers 516 and/or such switching transistors may switch the operation of CIM module 500 utilizing analog SRAM memory 530 between a VMM of the input vector and the weight matrix and a VMM of the input vector and the weight matrix transpose. ADCs 552 may be used to convert the analog output back to the digital domain.

CIM hardware module 500 may share the benefits of CIM hardware modules 100, 200, 300, and/or 400. Using CIM hardware module 500, efficiency and performance of a learning network may be improved. Because operations are performed in parallel, CIM hardware module 400 may dramatically reduce the time to perform VMMs generally. Thus, performing inference(s) using CIM hardware module 500 may require less time and power. As described, CIM hardware module 500 performs both a VMM for the weight matrix and a VMM for the weight matrix transpose while allowing the weights to remain stationary (e.g. unchanged) in memory cells 532. Further, memory 530 is an analog SRAM memory. Thus, area is reduced as compared to the use of two, separate CIM hardware modules for the matrix and matrix transpose. Latency is reduced as compared to the use of a single CIM hardware module in which the weights are read, stored, and rewritten for the matrix transpose. Thus, performance of a learning network incorporating CIM hardware module 500 may be improved.

Figure 6:
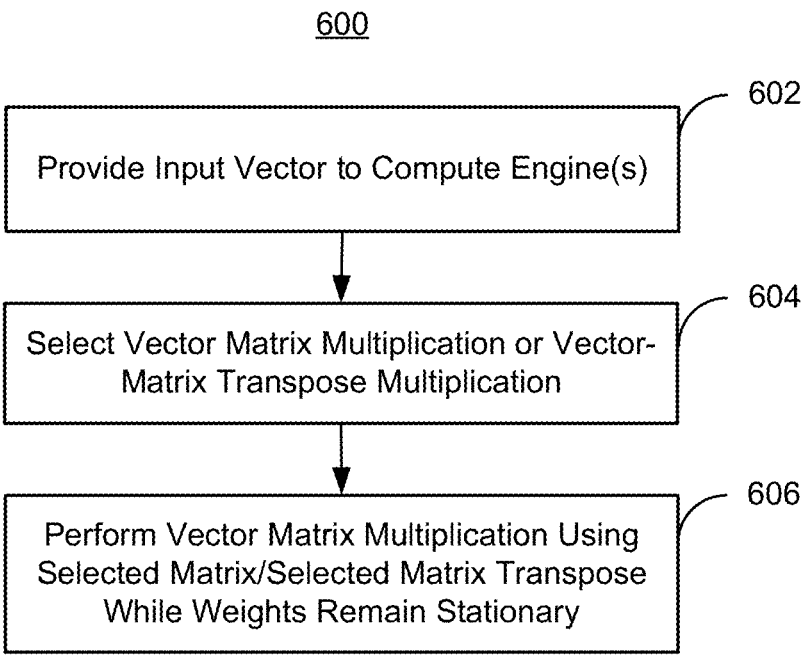
FIG. 6 is a flow chart depicting one embodiment of a method for performing in hardware a matrix multiplication and a matrix transpose multiplication in which the weights may remain stationary.

FIG. 6 is a flow chart depicting one embodiment of method 600 for performing in hardware a matrix multiplication and a matrix transpose multiplication in which the weights may remain stationary. Method 600 is described in the context of CIM hardware module 100. However, method 600 is usable with other CIM hardware modules, such as CIM hardware module 200, 300, 400, and/or 500. Although particular processes are shown in an order, the processes may be performed in another order, including in parallel. Further, processes may have substeps.

An input vector is provided to the CIM hardware module(s), at 602. The CIM hardware module stores weights and is configured to be capable of performing a VMM for the matrix stored and the transpose of the matrix stored. The VMM for the matrix or the matrix transpose is selected, at 1204. For example, a control signal indicating which operation is to be performed may be provided to the CIM hardware module. At 606, the selected VMM is performed. Thus, the input vector is multiplied by the weight matrix or the transpose of the weight matrix stored in the CIM hardware module(s) while allowing the weights to remain stationary.

For example, an input vector may be provided to CIM hardware module(s) 100, at 602. This vector may be provided by processor 160. At 604, the selection of the matrix or matrix transpose is provided to CIM hardware module(s) 100. For example, processor 160 may provide the appropriate commands and/or control signals. Based on the selection, CIM hardware module(s) 100 perform the VMM for the matrix or the matrix transpose. The operations for the VMM are performed in parallel and without movement of the weights stored in memory cells 132.

Using method 600, the benefits of CIM hardware modules 100, 200, 300, 400, and/or 500 may be achieved. Because operations are performed in parallel, method 600 may reduce the time to perform VMMs generally. Method 600 can perform both a VMM for the weight matrix and a VMM for the weight matrix transpose while allowing the weights to remain stationary (e.g. unchanged) in the memory cells. Thus, method 600 may enjoy the benefits of reduced latency and reduced area for the corresponding hardware described in the context of CIM hardware modules 100, 200, 300, 400, and 500. Thus, performance of a learning network incorporating method 600 and CIM hardware module(s) 100, 200, 300, 400, and/or 500 may be enhanced.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory including a plurality of memory cells storing a plurality of weights corresponding to a matrix; and
hardware compute logic coupled with the plurality of memory cells and configured to perform a vector-matrix multiplication (VMM) for the matrix and for a matrix transpose for the plurality of weights being stationary for the plurality of memory cells, wherein the hardware compute logic includes:
    multiplication circuitry for the plurality of memory cells, the multiplication circuitry multiplying at least a portion of a weight stored in a memory cell with a portion of an input vector to provide a product corresponding to the memory cell;
    selection logic; and
    a plurality of adder trees coupled with the selection logic and the memory, the plurality of adder trees for accumulating a sum of the product of each memory cell for a portion of the plurality of memory cells, the selection logic being configured to select a first portion of the plurality of adder trees for the VMM of the matrix and to select a second portion of the plurality of adder trees for the VMM of the matrix transpose, wherein the product is selectively provided to at least one of the first portion of the plurality of adder trees for the VMM of the matrix or to the second portion of the plurality of adder trees for the VMM of the matrix transpose,
    wherein the selection logic further includes a plurality of input multiplexers, the plurality of input multiplexers being configured to route an element of the input vector to a corresponding multiplication circuitry based on whether the VMM is for the matrix or the matrix transpose.

2. The system of claim 1, wherein the selection logic further includes:
    input logic configured to provide the portion of the input vector with the memory cell for the matrix or the matrix transpose.

3. The system of claim 1, wherein each adder tree of the plurality of adder trees shares at least one adder with another adder tree of the plurality of adder trees.

4. The system of claim 3, wherein the selection logic further includes a plurality of multiplexers, each multiplexer of the plurality of multiplexers is coupled with the at least one adder for selecting a product corresponding to the matrix or the matrix transpose.

5. The system of claim 1, wherein the selection logic is configured to provide, to the plurality of adder trees, the product for the matrix or for the matrix transpose for each memory cell of the plurality of memory cells.

6. The system of claim 1, wherein each of the plurality of memory cells is selected from a digital static random access memory (SRAM) memory cell and an analog SRAM memory cell.

7. The system of claim 1, wherein the selection logic is further configured to:
    receive a control signal indicating whether the VMM is for the matrix or the matrix transpose; and
    provide the control signal to the plurality of input multiplexers to control routing of elements of the input vector to corresponding multiplication circuitry based on whether the VMM is for the matrix or the matrix transpose.

8. The system of claim 4, wherein each multiplexer of the plurality of multiplexers is configured to select between a first product and a second product for providing to the at least one shared adder based on whether the VMM is for the matrix or the matrix transpose.

9. The system of claim 1, wherein the plurality of input multiplexers are arranged such that each input multiplexer corresponds to a respective multiplication circuitry, and each input multiplexer selects which element of the input vector is provided to its corresponding multiplication circuitry based on whether the VMM is for the matrix or the matrix transpose.

10. A hardware accelerator, comprising:
at least one processor; and
at least one compute tile including and coupled with the at least one processor, the at least one compute tile including a memory and hardware compute logic, the memory including a plurality of memory cells storing a plurality of weights corresponding to a matrix, the hardware compute logic being coupled with the plurality of memory cells and configured to perform a vector-matrix multiplication (VMM) for the matrix and for a matrix transpose for the plurality of weights being stationary for the plurality of memory cells, wherein the hardware compute logic includes:
    multiplication circuitry for the plurality of memory cells, the multiplication circuitry multiplying at least a portion of a weight stored in a memory cell with a portion of an input vector to provide a product corresponding to the memory cell;
    selection logic; and
    a plurality of adder trees coupled with the selection logic and the memory, the plurality of adder trees for accumulating a sum of the product of each memory cell for a portion of the plurality of memory cells, the selection logic being configured to select a first portion of the plurality of adder trees for the VMM of the matrix and to select a second portion of the plurality of adder trees for the VMM of the matrix transpose, wherein the product is selectively provided to at least one of the first portion of the plurality of adder trees for the VMM of the matrix or to the second portion of the plurality of adder trees for the VMM of the matrix transpose,
    wherein the selection logic further includes a plurality of input multiplexers, the plurality of input multiplexers being configured to route an element of the input vector to a corresponding multiplication circuitry based on whether the VMM is for the matrix or the matrix transpose.

11. The hardware accelerator of claim 10, wherein the selection logic further includes:
    input logic configured to provide the portion of the input vector with the memory cell for the matrix or the matrix transpose.

12. The hardware accelerator of claim 10, wherein each adder tree of the plurality of adder trees shares at least one adder with another adder tree of the plurality of adder trees.

13. The hardware accelerator of claim 12, wherein the selection logic further includes a plurality of multiplexers, each multiplexer of the plurality of multiplexers is coupled with the at least one adder for selecting a product corresponding to the matrix or the matrix transpose.

14. The hardware accelerator of claim 10, wherein the selection logic is configured to provide, to the plurality of adder trees, the product for the matrix or for the matrix transpose for each memory cell of the plurality of memory cells.

US 12,608,439 B2

19

20

15. The hardware accelerator of claim 10, wherein each of the plurality of memory cells is selected from a digital static random access memory (SRAM) memory cell and an analog SRAM memory cell.

16. The hardware accelerator of claim 10, wherein the memory and the hardware compute logic of each of the at least one compute tile are configured as a compute-in-memory (CIM) hardware module.

17. A method, comprising:

providing an input vector to a plurality of compute engines coupled with a processor, the plurality of compute engines including a compute-in-memory (CIM) hardware module, the CIM hardware module including a memory and hardware compute logic, the memory including a plurality of memory cells storing a plurality of weights corresponding to a matrix, the hardware compute logic coupled with the plurality of memory cells and configured to perform a vector-matrix multiplication (VMM) for the matrix and for a matrix transpose for the plurality of weights being stationary for the plurality of memory cells, the hardware compute logic including:

multiplication circuitry for the plurality of memory cells, the multiplication circuitry multiplying at least a portion of a weight stored in a memory cell with a portion of the input vector to provide a product corresponding to the memory cell;

selection logic; and a plurality of adder trees coupled with the selection logic and the memory, the plurality of adder trees for accumulating a sum of the product of each memory cell for a portion of the plurality of memory cells, the selection logic being configured to select a first portion of the plurality of adder trees for the VMM of the matrix and to select a second portion of the plurality of adder trees for the VMM of the matrix transpose, wherein the product is selectively provided to at least one of the first portion of the plurality of adder trees for the VMM of the matrix or to the second portion of the plurality of adder trees for the VMM of the matrix transpose, selecting the matrix or the matrix transpose; and performing the VMM of the input vector and the matrix or the matrix transpose based on the selecting and using at least one of the plurality of compute engines, wherein the selection logic further includes a plurality of input multiplexers, the plurality of input multiplexers being configured to route an element of the input vector to a corresponding multiplication circuitry based on whether the VMM is for the matrix or the matrix transpose.

18. The method of claim 17, wherein each adder tree of the plurality of adder trees shares at least one adder with another adder tree of the plurality of adder trees.

19. The method of claim 17, wherein the selection logic is configured to provide, to the plurality of adder trees, the product for the matrix or for the matrix transpose for each memory cell of the plurality of memory cells.

20. The method of claim 17, further comprising providing the input vector to an input buffer prior to providing the input vector to the plurality of compute engines, the input buffer temporarily storing elements of the input vector.

* * * * *